D. E. ROE.

Broilers.

No. 5,830.

Reissued April 7, 1874.

Witnesses

Thomas M. Hale

A. D. Blair

Inventor

David E. Roe

AM. PHOTO-LITHOGRAPHIC CO. N. Y. (OSBORNE'S PROCESS.)

UNITED STATES PATENT OFFICE.

DAVID E. ROE, OF ELMIRA, NEW YORK.

IMPROVEMENT IN BROILERS.

Specification forming part of Letters Patent No. 106,210, dated August 9, 1870; reissue No. 4,651, dated November 28, 1871; reissue No. 5,830, dated April 7, 1374; application filed April 29, 1872.

DIVISION A.

*To all whom it may concern:*

Be it known that I, DAVID E. ROE, of Elmira, in the county of Chemung and State of New York, have invented certain new and useful Improvements in Broilers; and I do hereby declare the following to be a full, clear, and exact description of the same, reference being had to the accompanying drawings, which form a part of this specification, and in which—

Figure 1:
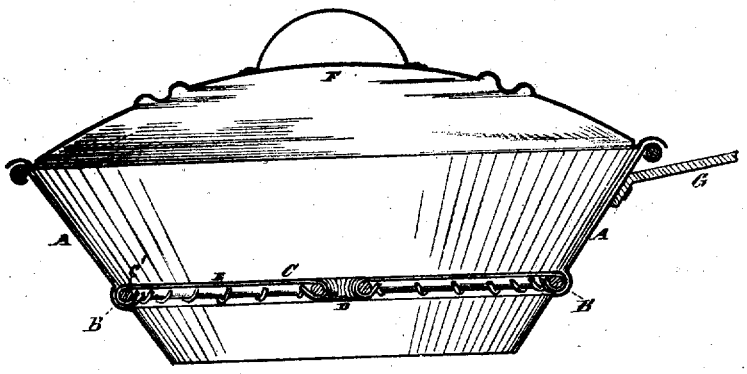
Figure 2:
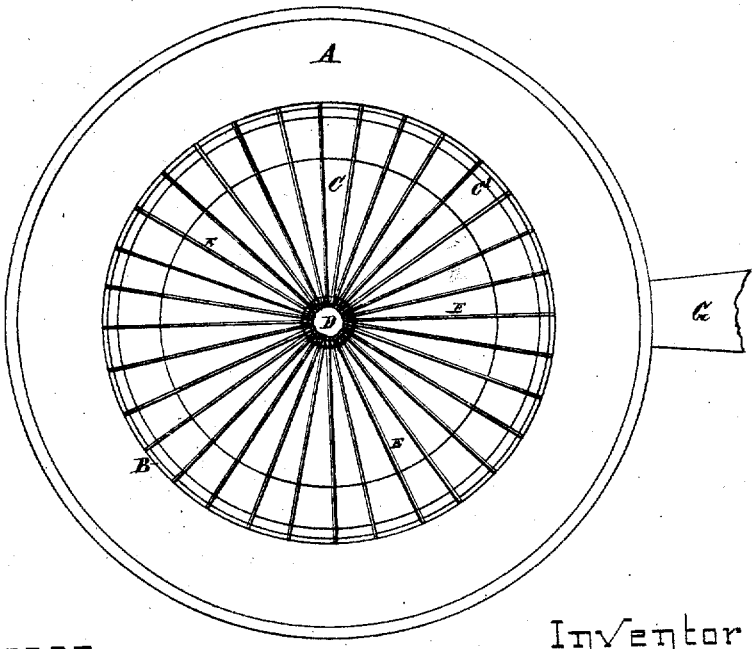

Figure 1 represents a central vertical section of my improved broiler, and Fig. 2 represents a plan view of the same with the cover removed.

To enable those skilled in the art to which my invention belongs to make and use the same, I will proceed to describe it more in detail.

The object of my invention is to produce a broiler which can be readily used upon stoves with various-sized holes—one which shall be light, strong, and durable, and at the same time be neat and convenient for use, easy to keep clean, and which may also be manufactured with facility. The nature of my invention consists, first, in a broiler-frame provided with a horizontal groove upon its inner side, for the purpose hereafter stated; second, in the combination with the frame of the broiler, provided with a horizontal groove, as hereafter described, of a removable grate or gridiron, for the purposes hereinafter stated; third, in the combination of a removable gridiron with the frame of the broiler, in such a manner that its weight will be borne by the broiler-frame without being permanently attached thereto; fourth, in a broiler provided with a removable grate or gridiron and a downwardly-projecting conical-shaped part, for entering the hole of the stove, for the purposes hereinafter set forth; fifth, in a peculiarly-shaped body or frame and a removable grate or gridiron of peculiar construction, as hereinafter described.

In the drawings, the parts marked A represent the body or frame, which may be made either of sheet or cast metal, as preferred, and of any desired size. Its shape, in this instance, is that of the frustum of a cone inverted, but it may be made in the form of a spherical zone. A horizontal groove, B, is formed in the side of the frame A, from which the grate or gridiron C receives its support. The grate or gridiron C is made, in this instance, to fit into the groove B so that it can be readily taken out at any time when desired, but is held in place by the upper flange or edge of the groove, past which it is sprung, so that there is no liability of its being slipped out of place or detached by the ordinary use of the broiler. The groove B may be formed at any position between the upper and lower edges of the frame A, as best suits the taste or convenience of the manufacturer. The grate or gridiron is to be made of a size to correspond with the diameter of the frame at the height where the groove is formed. The grate or gridiron C, in this instance, is made from wires, in the form indicated, and comprises an outer rim or hoop, C′, and center ring D, joined to each other by radial wires or bars E. The inner ends of the radial wires E are bent around the center ring D, to hold them all together, and their outer ends are secured to the hoop or rim C′ in a similar manner, and they are prevented from slipping out of place upon the hoop C′ by being laid into dents or depressions formed therein; or they may be secured by small whipping wire, if preferred.

By making the grate or gridiron of smooth wires, it is much easier cleaned, and the meat is less liable to adhere to it than when made from wire cloth or crossed bars of wire.

The broiler is provided with a cover, F, and handle G, which may be made in any form or design to suit the taste or convenience of the manufacturer, and the body and groove of the broiler may be varied to suit the various kinds of grates or gridirons applied thereto.

The food to be broiled is placed upon the grate or gridiron C, and the lower edge A′ of the frame A is set into the opening or hole in the top of the stove.

By making the broiler with a downwardly-projecting conical-shaped part, to enter the hole in the stove below the grate, the broiler can be applied with ease to stoves having different-sized holes. Then, again, the conical-shaped projection for entering the hole in the stove serves as a guide in placing the broiler in the hole. This last feature is of great importance, since it enables the maker to construct the broilers of a uniform size, thereby lessening the expense and trouble and greatly facilitating their manufacture, while, at the same time, the conical projection serves to conduct the drip directly into the fire.

By supporting the grate or gridiron C in a horizontal groove, B, it is retained securely in position, so that it will not be liable to become tilted or displaced while turning the meat, or by any excess of pressure upon one side. The groove is also much easier constructed than would be a flange or lugs for the purpose. The gridiron C being removable, the broiler is very easily kept clean, and, in case the wires should get rusty, or become bent or broken, it can be readily taken out and repaired, or be replaced by a new one.

Having described my improved broiler, what I claim therein as new and of my invention, and desire to secure by Letters Patent, is—

1. The combination, with a broiler-frame, of a horizontal groove for supporting the internal parts of the broiler.

2. The combination, with a broiler-frame provided with a horizontal groove, of a removable grate or gridiron for supporting the food to be broiled.

3. The combination of a removable grate or gridiron with the frame of a broiler, in such a manner that its weight will be borne by the broiler-frame without its being permanently attached thereto, substantially as described.

4. A broiler provided with a removable grate, and having combined therewith a downwardly-projecting conical-shaped part for entering the hole in the stove-top, and for conducting the drip directly into the fire.

DAVID E. ROE.

Witnesses:
THOMAS M. HILE,
A. D. BLAIR.